United States Patent
Lee et al.

(10) Patent No.: US 8,711,662 B2
(45) Date of Patent: Apr. 29, 2014

(54) NEAR-FIELD TRANSDUCERS FOR FOCUSING LIGHT

(75) Inventors: Lien Lee, St. Paul, MN (US); Xuhui Jin, Shakopee, MN (US); Kaizhong Gao, Shoreview, MN (US); Amit Itagi, Hugo, MN (US); William A. Challener, Schenectady, NY (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/590,214

(22) Filed: Aug. 21, 2012

(65) Prior Publication Data

US 2012/0314549 A1    Dec. 13, 2012

Related U.S. Application Data

(63) Continuation of application No. 12/272,984, filed on Nov. 18, 2008, now Pat. No. 8,248,891.

(51) Int. Cl.
| | |
|---|---|
| *G11B 11/00* | (2006.01) |
| *G11B 5/31* | (2006.01) |
| *G11B 5/48* | (2006.01) |
| *G11B 5/60* | (2006.01) |
| *G11B 7/122* | (2012.01) |
| *G11B 7/1387* | (2012.01) |
| *G11B 7/1384* | (2012.01) |
| *G11B 5/00* | (2006.01) |
| *G11B 11/105* | (2006.01) |

(52) U.S. Cl.
CPC .............. *G11B 5/314* (2013.01); *G11B 5/4866* (2013.01); *G11B 5/6088* (2013.01); *G11B 7/122* (2013.01); *G11B 7/1387* (2013.01); *G11B 7/1384* (2013.01); *G11B 2005/0021* (2013.01); *G11B 11/10536* (2013.01); *G11B 2005/0005* (2013.01)

USPC ......... 369/13.33; G9B/11; 428/810; 428/815; 428/816

(58) Field of Classification Search
None
See application file for complete search history.

(56) References Cited

U.S. PATENT DOCUMENTS

| | | | | |
|---|---|---|---|---|
| 6,795,630 | B2 * | 9/2004 | Challener et al. | 385/129 |
| 6,944,112 | B2 | 9/2005 | Challener | |
| 7,027,700 | B2 * | 4/2006 | Challener | 385/129 |
| 7,272,079 | B2 | 9/2007 | Challener | |
| 7,706,654 | B2 * | 4/2010 | Peng et al. | 385/131 |
| 7,864,434 | B2 * | 1/2011 | Peng | 359/642 |
| 7,965,464 | B2 | 6/2011 | Batra | |
| 8,248,891 | B2 * | 8/2012 | Lee et al. | 369/13.17 |

(Continued)

OTHER PUBLICATIONS

File History for U.S. Appl. No. 12/272,984.
Boerner et al., "Effect of Damping on the Time Variation of Fields Produced by a Small Pole Tip with a Soft Under Layer", IEEE Transactions on Magnetics, vol. 40, No. 4, Jul. 2004, pp. 2371-2373.

(Continued)

*Primary Examiner* — Kevin Bernatz
(74) *Attorney, Agent, or Firm* — Hollingsworth Davis, LLC

(57) ABSTRACT

An apparatus includes a waveguide shaped to direct light to a focal point, and a near-field transducer positioned adjacent to the focal point, wherein the near-field transducer includes a dielectric component and a metallic component positioned adjacent to at least a portion of the dielectric component. An apparatus includes a waveguide shaped to direct light to a focal point, and a near-field transducer positioned adjacent to the focal point, wherein the near-field transducer includes a first metallic component, a first dielectric layer positioned adjacent to at least a portion of the first metallic component, and a second metallic component positioned adjacent to at least a portion of the first dielectric component.

19 Claims, 11 Drawing Sheets

(56) References Cited

U.S. PATENT DOCUMENTS

| | | | |
|---|---|---|---|
| 8,385,159 B2* | 2/2013 | Gao et al. | 369/13.33 |
| 8,451,705 B2* | 5/2013 | Peng et al. | 369/112.27 |
| 8,514,673 B1* | 8/2013 | Zhao et al. | 369/13.33 |
| 2001/0004348 A1* | 6/2001 | Ueyanagi | 369/118 |
| 2004/0001394 A1 | 1/2004 | Challener et al. | |
| 2005/0078565 A1* | 4/2005 | Peng et al. | 369/13.32 |
| 2005/0289576 A1 | 12/2005 | Challener | |
| 2007/0058686 A1 | 3/2007 | Capasso et al. | |
| 2008/0068748 A1* | 3/2008 | Olson et al. | 360/110 |
| 2008/0123219 A1 | 5/2008 | Gomez et al. | |
| 2008/0170319 A1* | 7/2008 | Seigler et al. | 360/59 |
| 2009/0073858 A1 | 3/2009 | Seigler | |
| 2013/0064502 A1* | 3/2013 | Peng et al. | 385/31 |
| 2013/0071062 A1* | 3/2013 | Peng et al. | 385/31 |

OTHER PUBLICATIONS

Milster et al., "Generation of Compact Near-Field Energy for Optical Recording: Transducer Efficiency and Signal Detection", Jpn. J. App. Phys., vol. 42, 2003, pp. 1095-1100.

Challener et al., "Miniature Planar Solid Immersion Mirror with Focused Spot Less Than a Quarter Wavelength", Optics Express, vol. 13, No. 18, Sep. 5, 2005, pp. 7189-7197.

Olkkonen et al., "Light Transmission Through a High Index Dielectric-filled Sub-Wavelength Hole in a Metal Film", Optics Express, vol. 13, No. 8, Sep. 5, 2005, pp. 6980-6989.

Rottmayer et al., "Heat-Assisted Magnetic Recording", IEEE Transactions on Magnetics, vol. 42, No. 10, Oct. 2006, pp. 2417-2421.

Seigler et al., "Integrated Heat Assisted Magnetic Recording Head: Design and Recording Demonstration", IEEE Transactions on Magnetics, vol. 44, No. 1, Jan. 2008, pp. 119-124.

* cited by examiner

NEAR-FIELD TRANSDUCERS FOR FOCUSING LIGHT

CROSS REFERENCE TO RELATED PATENT APPLICATIONS

This is a continuation of U.S. Ser. No. 12/272,984 filed Nov. 18, 2008, which is incorporated by reference in its entirety.

BACKGROUND

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. For heat assisted magnetic recording (HAMR) a tightly confined, high power laser light spot is used to heat a portion of the recording medium to substantially reduce the coercivity of the heated portion. Then the heated portion is subjected to a magnetic field that sets the direction of magnetization of the heated portion. In this manner the coercivity of the medium at ambient temperature can be much higher than the coercivity during recording, thereby enabling stability of the recorded bits at much higher storage densities and with much smaller bit cells.

In heat assisted magnetic recording, information bits are recorded on a storage layer at elevated temperatures, and the heated area in the storage layer determines the data bit dimension. Focusing devices such as a solid immersion lens (SIL) or a solid immersion mirror (SIM) can focus light down to a spot size that is of the order of half or quarter of a wavelength. To focus light down to spot sizes that are of the order of a tenth of a wavelength, near-field transducers (NFTs) are needed.

One approach for directing light onto a storage layer uses a planar solid immersion mirror or lens (PSIM), fabricated on a planar waveguide and a near-field transducer, in the form of an isolated metallic nanostructure placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent storage medium and get absorbed, raising the temperature of the medium locally for recording. This design is sensitive of the shape of the NFT, and the location of the NFT in the waveguide. A larger amount of light is absorbed if the isolated near-field transducer is buried in a dielectric of lower thermal dissipation than the medium.

SUMMARY

In a first aspect, the invention provides an apparatus including a waveguide shaped to direct light to a focal point, and a near-field transducer positioned adjacent to the focal point, wherein the near-field transducer includes a dielectric component and a metallic component positioned adjacent to at least a portion of the dielectric component.

In another aspect, the invention provides an apparatus including a waveguide shaped to direct light to a focal point, and a near-field transducer positioned adjacent to the focal point, wherein the near-field transducer includes a first metallic component, a first dielectric layer positioned adjacent to at least a portion of the first metallic component, and a second metallic component positioned adjacent to at least a portion of the first dielectric component.

DETAILED DESCRIPTION OF THE INVENTION

Figure 1:
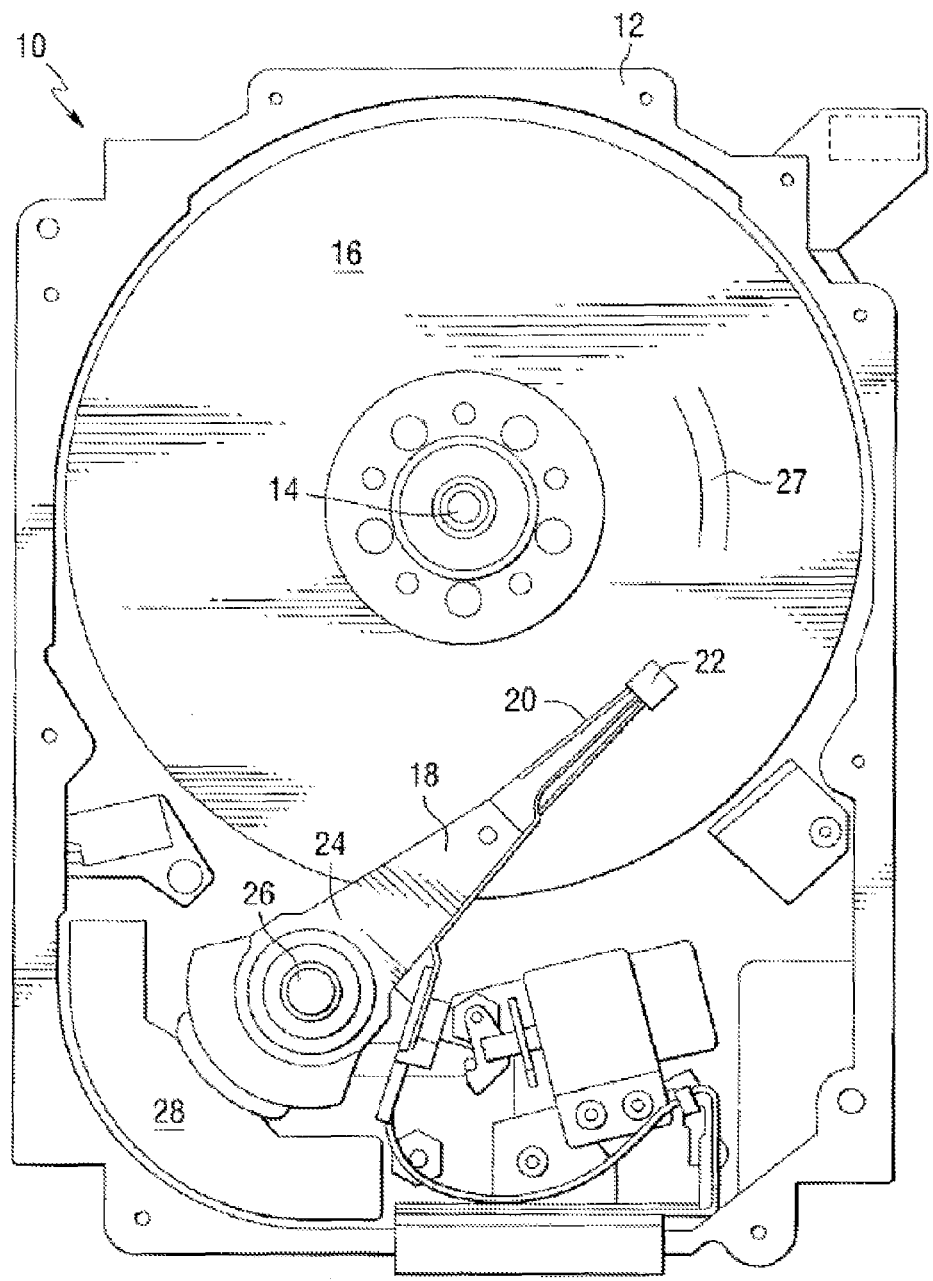
FIG. 1 is a pictorial representation of a data storage device in the form of a disc drive that can include a transducer in accordance with an aspect of this invention.

This invention encompasses various devices used for heat assisted magnetic recording. FIG. 1 is a pictorial representation of a data storage device in the form of a disc drive 10 that can utilize a storage media constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light to the storage media for localized heating of the storage media. To launch light into the waveguide, a grating coupler can be used.

While FIG. 1 shows a disc drive, the invention can be applied to other storage devices that include a transducer and a storage media, wherein the storage media is heated to facilitate switching of bits in the storage media. Other such storage devices can include, for example, probe type data storage devices. In addition, the inverse near-field transducers of this invention can be used in other applications that can benefit from the concentration of electromagnetic radiation into a small spot. Such other applications include nanomanufacturing, and biomedical optical sensing.

Figure 2:
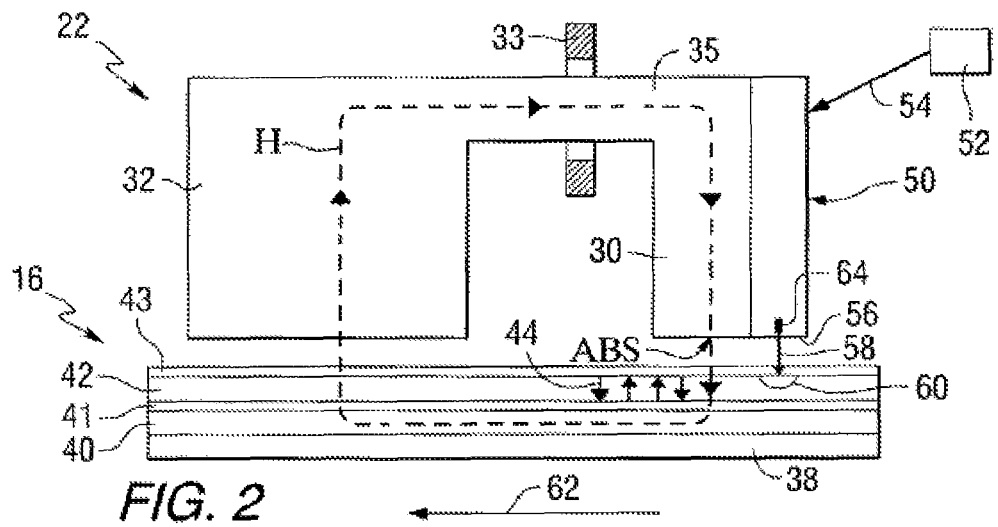
FIG. 2 is a schematic illustration of a heat assisted magnetic recording head and an adjacent data storage media.

FIG. 2 is a schematic side view of a HAMR recording head 22 and a magnetic storage media 16. Although this example shows a perpendicular magnetic recording head and a perpendicular magnetic storage media, it will be appreciated that the invention may also be used in conjunction with other types of recording heads and/or storage media where it may be desirable to employ heat assisted recording.

In the example of FIG. 2, the head 22 includes a writer section comprising a main write pole 30 and a return or opposing pole 32 that are magnetically coupled by a yoke or pedestal 35. It will be appreciated that the head 22 may be constructed with a write pole 30 only and no return pole 32 or yoke 35. A magnetization coil 33 surrounds the yoke or pedestal 35 for energizing the head 22. The HAMR head 22 may also include a read portion, not shown, which may be any conventional type read head as is generally known in the art. The storage media 16 is positioned adjacent to or under the recording head 22. Relative movement between the head and the media is indicated by arrow 62.

As illustrated in FIG. 2, the recording head 22 also includes a structure for heating the magnetic storage media 16 proximate to where the write pole 30 applies the magnetic write field H to the storage media 16. The media 16 includes a substrate 38, a heat sink layer 40, a seed layer 41, a magnetic recording layer 42, and a protective layer 43. A magnetic field H produced by current in the coil 33 is used to control the direction of magnetization of bits 44 in the recording layer of the media.

The structure for heating the media may include, for example, a planar optical waveguide schematically represented by reference number 50. The waveguide 50 conducts energy from a source 52 of electromagnetic radiation, which may be, for example, ultraviolet, infrared, or visible light. The source 52 may be, for example, a laser diode, or other suitable laser light source for directing a light beam 54 toward the waveguide 50. Various techniques that are known for coupling the light beam 54 into the waveguide 50 may be used. For example, the light source 52 may work in combination with an optical fiber and external optics for collimating the light beam 54 from the optical fiber toward a diffraction grating on the waveguide. Alternatively, a laser may be mounted on the waveguide 50 and the light beam 54 may be directly coupled into the waveguide 50 without the need for external optical configurations. Once the light beam 54 is coupled into the waveguide 50, the light propagates through the waveguide 50 toward a truncated end 56 of the waveguide 50 that is formed adjacent the air bearing surface (ABS) of the recording head 22. Light 58 exits the end of the waveguide and heats a portion 60 of the media, as the media moves relative to the recording head as shown by arrow 62. A near-field transducer 64 can be positioned in or adjacent to the waveguide 50 to further concentrate the light in the vicinity of the air bearing surface.

The recording head of FIG. 2 is shown as an example of a recording head that can include an aspect of the invention. However it should be understood that the invention is not limited to use in the recording head illustrated in FIG. 2.

Figure 3:
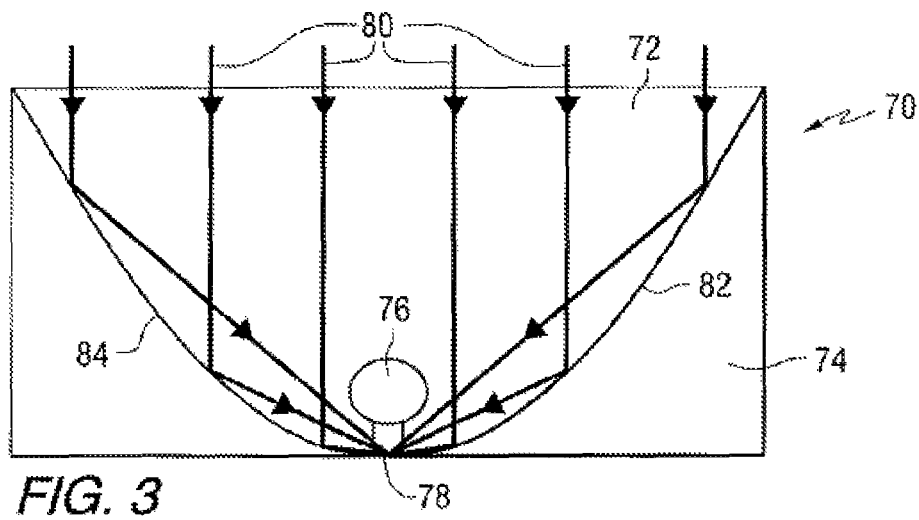
FIG. 3 is a schematic representation of an optical condenser.

FIG. 3 is a schematic representation of a condenser 70 for focusing light to a small spot. The condenser includes a solid-immersion-mirror (SIM) in the form of a parabolic mirror 72 formed in a planar waveguide 74, and a near-field transducer (NFT) 76 placed in the planar waveguide 74 near a focal point 78. Light 80, which is coupled into the waveguide using known techniques, is reflected by the sidewalls 82 and 84, which may have a parabolic shape, to the focal point. The light can be coupled into the waveguide using two gratings on opposite sides of a centerline and offset by a distance such that the coupled light enters the waveguide with a 180.degree. phase shift between the two halves of the waveguide. At the focal point, the offset gratings cause the electric field of the light to be polarized in the longitudinal direction, which is along the axis of symmetry of the condenser. The longitudinal electric field couples strongly to the transducer when it is oriented along the axis of symmetry.

Existing modeling shows that the temperature rise in the NFT could go up to 1000.degree. C. by absorbing only 1 mW optical power, which indicates that a cooling mechanism may be needed for NFT functioning. In addition, the resonant surface plasmon mode of NFT excited by the perpendicular electric field at the focus has a lower coupling efficiency into the medium than the transverse electric field.

Figure 4A:
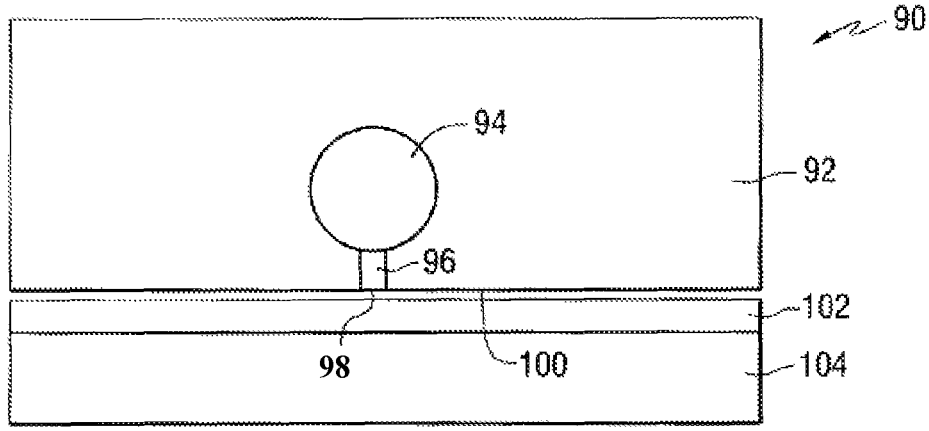
FIG. 4A is a schematic representation of an inverse NFT.

In one aspect, this invention uses an inverse Near-Field Transducer (iNFT) design. FIG. 4A is a schematic representation of an inverse NFT 90. The inverse near-field transducer includes a relatively large metallic component in the form of a generally planar metal plate 92 and a dielectric component that is embedded in, or at least partially surrounded by, the metal component. The dielectric component includes a first, or enlarged, portion in the form of a disc 94 and a second portion in the form of a dielectric peg 96. The disc and peg can be separated by a gap. In this example the disc and peg are located near the middle of the plate. The transducer can be used in combination with a waveguide having a core guiding layer and at least one cladding layer.

The waveguide can be mounted in a recording head, not shown, and the near-field transducer can be positioned in the core layer or the cladding layer, such that an end 98 of the peg 96 is positioned adjacent to an air bearing surface 100. The recording head can be positioned adjacent to a storage layer 102 of a recording medium 104. The front and back of the transducer is covered by cladding or core dielectrics.

Figure 4C:
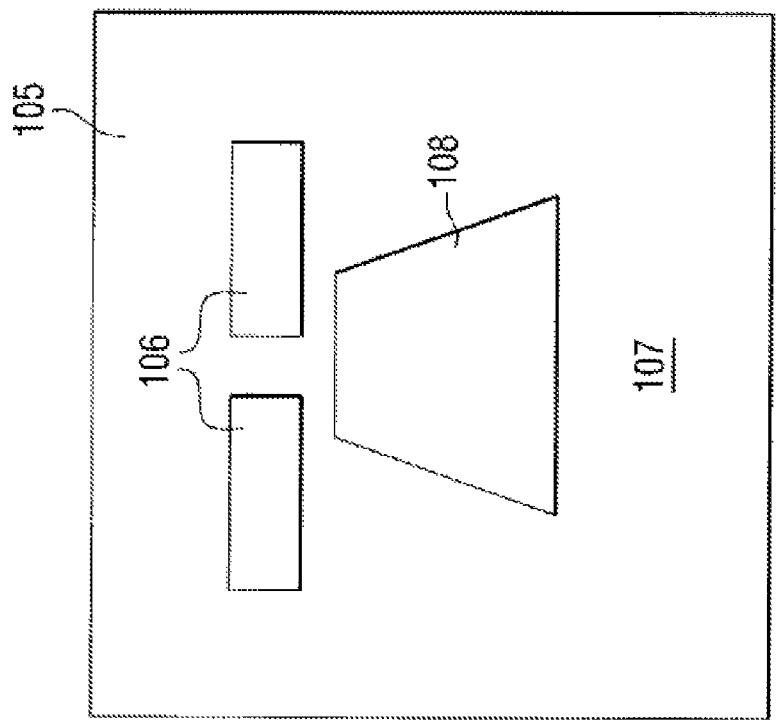
FIG. 4C is a plan view of an air bearing surface of a portion of another recording head including an inverse NFT.
Figure 4B:
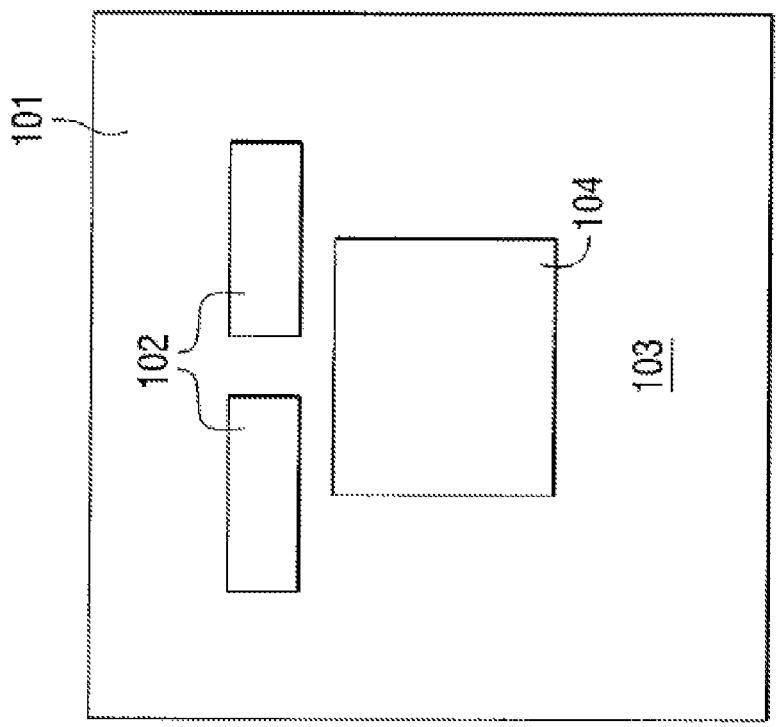
FIG. 4B is a plan view of an air bearing surface of a portion of a recording head including an inverse NFT.

The inverse NFT can also be used with a channel waveguide, in which a core having rectangular or trapezoidal shape is embedded in cladding materials as shown in FIGS. 4B and 4C. FIG. 4B is a plan view of an air bearing surface 101 of a portion of a recording head including an inverse NFT. The inverse NFT includes metal portions 102 embedded in a dielectric cladding material 103. The dielectric cladding material is also positioned in a gap between the metal portions. A waveguide is formed by a core 104 embedded in the cladding material. The core of the waveguide has a rectangular cross-section and terminates adjacent to the inverse NFT.

FIG. 4C is a plan view of an air bearing surface 105 of a portion of a recording head including an inverse NFT. The inverse NFT includes metal portions 106 embedded in a dielectric cladding material 107. The dielectric cladding material is also positioned in a gap between the metal portions. A waveguide is formed by a core 108 embedded in the cladding material. The core of the waveguide has a trapezoidal cross-section and terminates adjacent to the inverse NFT.

Figure 5:
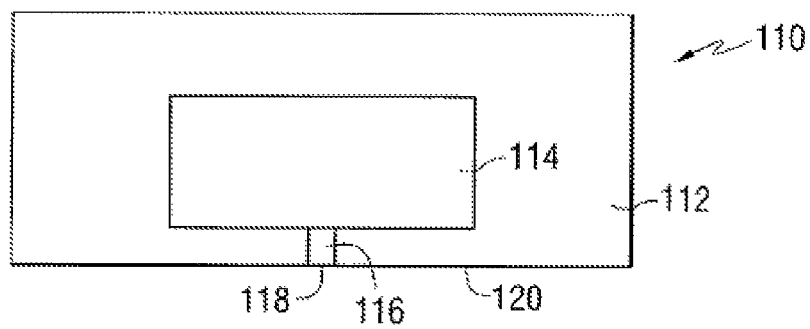
FIG. 5 is a schematic representation of another inverse NFT.

FIG. 5 is a schematic representation of another NFT 110. NFT 110 includes a metal component in the form of a metal plate 112 and a dielectric component at least partially surrounded by the metal component. The dielectric component in this example includes a rectangular dielectric portion 114 and a dielectric peg 116 positioned in or adjacent to the plate. The rectangular dielectric portion and peg can be separated by a gap. In this example the rectangular portion and peg are located near the middle of the plate. The transducer can be used in combination with a waveguide having a core guiding layer and at least one cladding layer. The waveguide can be mounted in a recording head, not shown, and the near-field transducer can be positioned in the core layer or the cladding layer, such that an end 118 of the peg 116 is positioned adjacent to an air bearing surface 120, and the recording head can be positioned adjacent to a storage layer of a recording medium, not shown.

Figure 6:
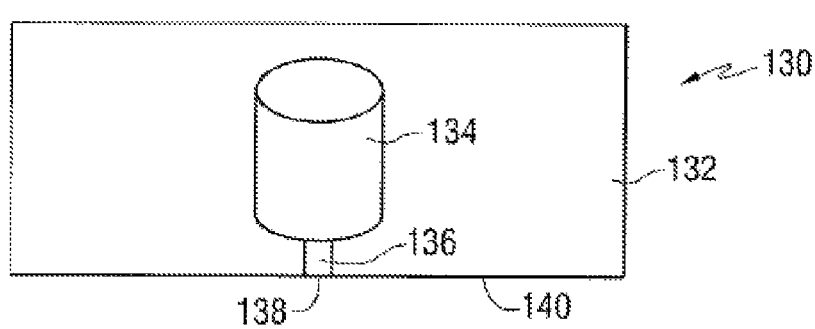
FIG. 6 is a schematic representation of another inverse NFT.

FIG. 6 is a schematic representation of another NFT 130. NFT 130 includes a metal component in the form of a metal plate 132 and a dielectric component at least partially surrounded by the metal component. The dielectric component includes a cylindrical dielectric portion 134 and a rectangular dielectric portion peg 136 positioned in or adjacent to the plate. The cylindrical dielectric portion and peg can be separated by a gap. In this example the cylindrical portion and peg are located near the middle of the plate. The transducer can be used in combination with a waveguide having a core guiding layer and at least one cladding layer. The waveguide can be mounted in a recording head, not shown, and the near-field transducer can be positioned in the core layer or the cladding layer, such that an end 138 of the peg 136 is positioned adjacent to an air bearing surface 140, and the recording head can be positioned adjacent to a storage layer of a recording medium, not shown.

Figure 7:
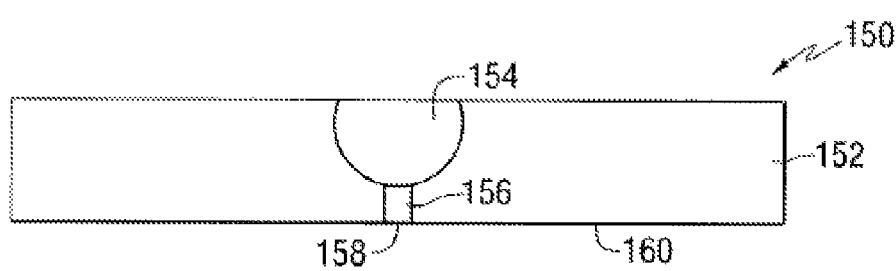
FIG. 7 is a schematic representation of an inverse NFT with shaped metallic parts.

FIG. 7 is a schematic representation of another NFT 150. NFT 150 includes a metal component in the form of a metal plate 152 and a dielectric component at least partially surrounded by the metal component. The dielectric component includes a partially circular dielectric portion 154 and a dielectric peg 156 positioned in or adjacent to the plate. The disc and peg can be separated by a gap. In this example the partially circular portion and peg are located near the middle of the plate. The transducer can be used in combination with a waveguide having a core guiding layer and at least one cladding layer. The waveguide can be mounted in a recording head, not shown, and the near-field transducer can be positioned in the core layer or the cladding layer, such that an end 158 of the peg 156 is positioned adjacent to an air bearing surface 160, and the recording head can be positioned adjacent to a storage layer of a recording medium, not shown.

Figure 8:
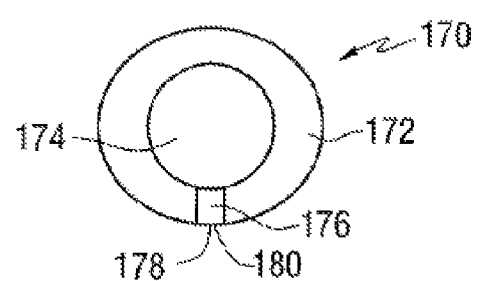
FIG. 8 is a schematic representation of another inverse NFT with shaped metallic parts.

FIG. 8 is a schematic representation of another NFT 170. NFT 170 includes a metal component in the form of a metal disc 172 and a dielectric component at least partially surrounded by the metal component. The dielectric component includes a generally circular dielectric portion 174 in the form of a disc and a dielectric peg 176 positioned in or adjacent to the disc 172. The disc and peg can be separated by a gap. The transducer can be used in combination with a waveguide having a core guiding layer and at least one cladding layer. The waveguide can be mounted in a recording head, not shown, and the near-field transducer can be positioned in the core layer or the cladding layer, such that an end 178 of the peg 176 is positioned adjacent to an air bearing surface 180, and the recording head can be positioned adjacent to a storage layer of a recording medium, not shown.

Figure 9A:
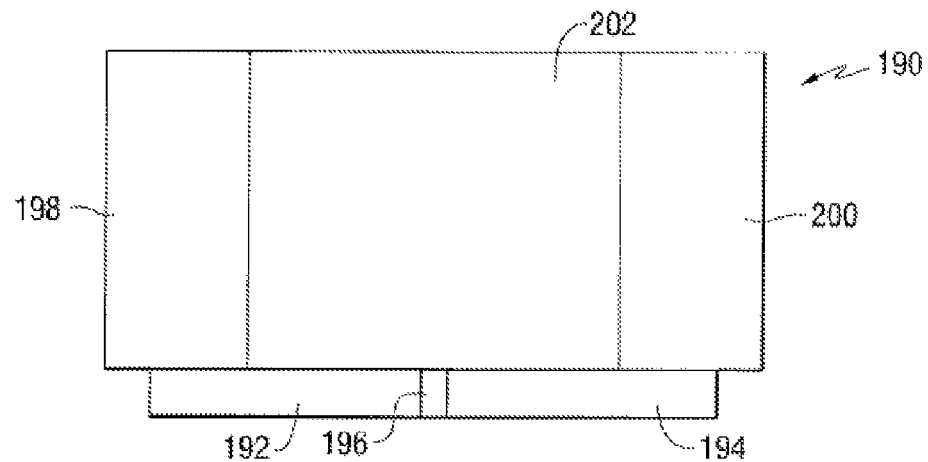
FIG. 9A is a schematic representation of a condenser including a pair of nanorods attached with long wires.

FIG. 9A is a schematic representation of transducer 190 including a pair of nanorods 192, 194, separated by a nanogap 196, and attached with two relatively long metallic wires 198, 200. The wires should be long enough to dissipate the absorbed light in the nanorods and they shouldn't disturb the resonant LSP mode in the nanorods. The gap 202 between the wires 198 and 200 can be filled with a cladding or core dielectric. In addition, the core or cladding dielectric material can be positioned adjacent to the front and back of the structures of FIG. 9. The wires can have a rectangular cross-section in a plane parallel to the ABS, and/or in a plane perpendicular to the ABS. The nanorods and wires can be constructed of plasmonic metals, such as gold, silver, aluminum, copper and their alloys.

Figure 9B:
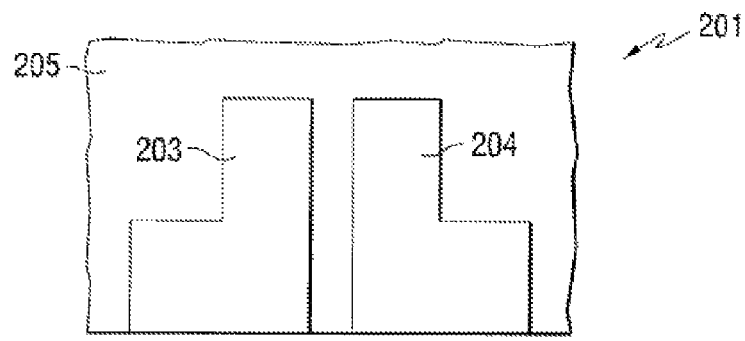
FIG. 9B is a schematic representation of another condenser including a pair of nanorods.
Figure 9C:
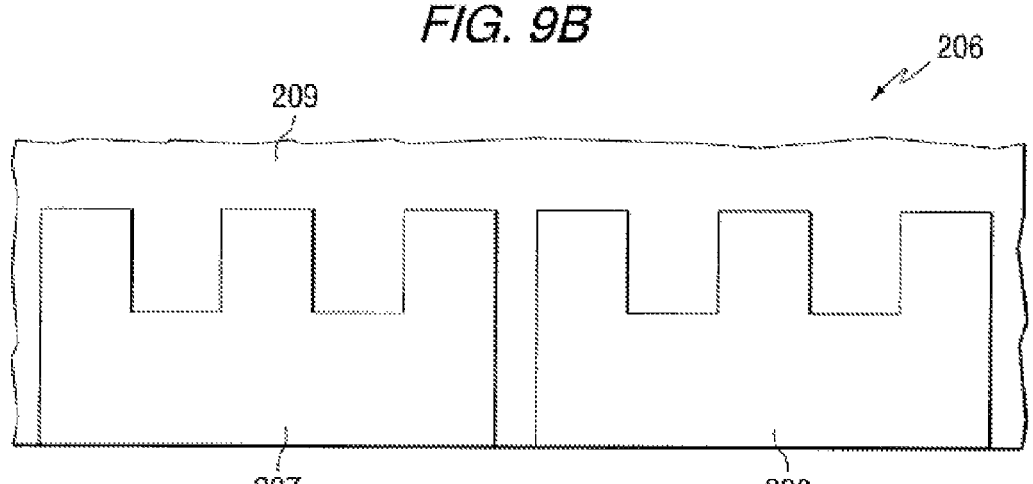
FIG. 9C is a schematic representation of another condenser including a pair of nanorods.

FIGS. 9B and 9C show a few other configurations of iNFT. FIG. 9B is a schematic representation of another condenser 201 including a pair of nanorods 203, 204 embedded in a dielectric material 205.

FIG. 9C is a schematic representation of another condenser 206 including a pair of nanorods 207, 208 embedded in a dielectric material 209.

From a recording aspect, the inverse near-field transducers of this invention have significant advantages over existing approaches. For HAMR, the primary issue is power consumption and associated issues. In a recording process, the NFT converts optical power to heat, which is absorbed by the recording media. However, the recording media are made of ferromagnetic metallic materials. Due to boundary condition matching, the inverse near-field transducers will lead to a significant improvement of the media absorption coefficient. Previously known approaches will lead to a smaller absorption rate and a much higher reflection rate.

In other words, in known approaches, more energy will be reflected back to the NFT and the magnetic write head and the reflected energy will eventually be absorbed by the transducer head. This may lead to a further increase of the temperature at both the write head pole tip and the overall temperature of the transducer. Heating the pole tip may cause the effective moment at the write head to be reduced and may cause more noise during switching, which may lead to an increase in transition jitter. Increased overall temperature of the transducer may lead to thermal protrusion of the recording head which may lead to several significant problems including damaging of the write head.

Thus even for the same energy transfer coefficient, a design that leads to an increase in the media absorption rate will not only improve power efficiency, but also help with head performance and reliability. The whole system can benefit in both the performance aspect and the reliability aspect.

Figure 10:
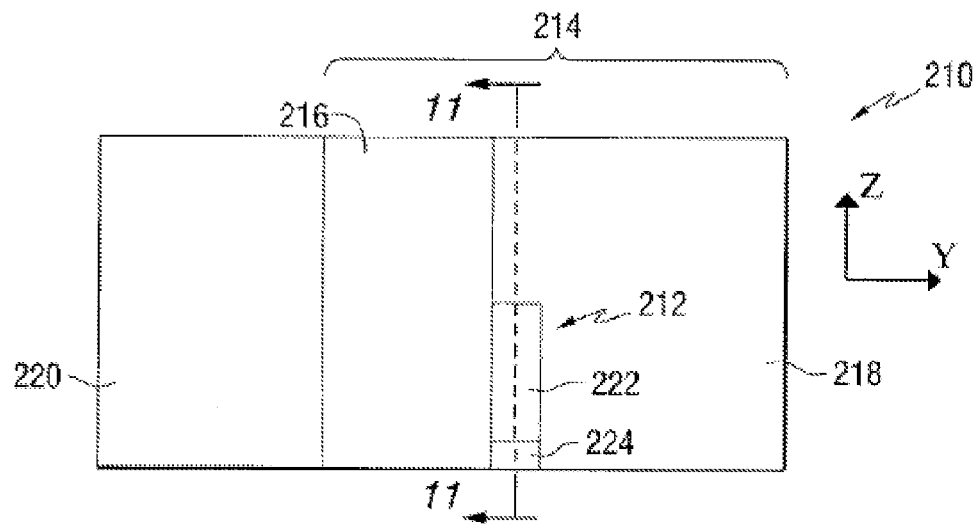
FIG. 10 is a side elevation view of a condenser including an iNFT in a PSIM waveguide.

The iNFT could be placed in the core or cladding of the planar solid immersion mirror (PSIM). FIG. 10 is a side elevation view of a condenser 210 including an iNFT 212 in the PSIM waveguide 214. The waveguide includes a core layer 216 and a cladding layer 218. The core is connected directly or indirectly to a support structure 220, which may be a component of a recording head. The iNFT includes a disc portion 222 and a peg 224.

Light can be coupled into the PSIM using an offset grating, such that the dominant electric field polarization at the focus is along the axis of the near-field transducer, wherein the axis is generally perpendicular to the plane of an adjacent storage medium. This field excites a resonant localized surface plasmon mode in the NFT/medium coupled system. This localized surface plasmon mode transfers energy into the medium.

Figure 11:
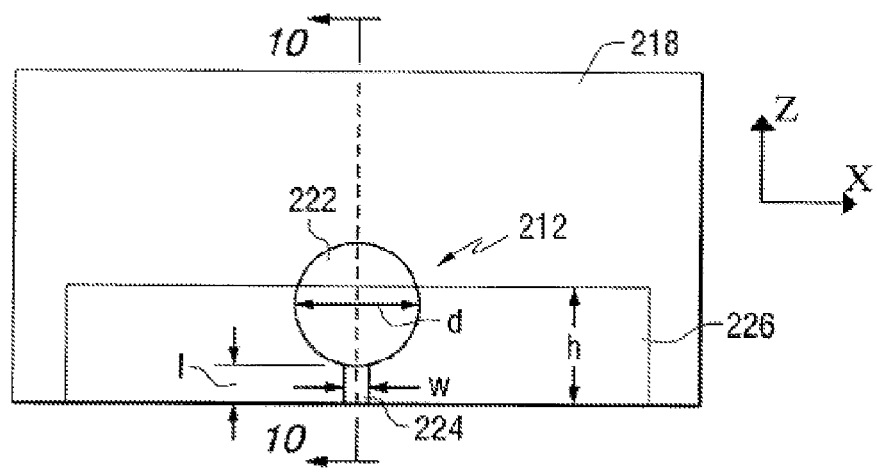
FIG. 11 is a cross-sectional view of the PSIM waveguide of FIG. 10 taken along line 11-11.

FIG. 11 is a cross-sectional view of the PSIM waveguide of FIG. 10 taken along line 11-11. FIG. 11 shows that the iNFT further includes a metal plate 226. The disc 222 is partially embedded in the metal plate and the peg 224 is embedded in the metal plate.

The material of the dielectric disc 222 and peg 168 could be the same as the core or cladding materials or another dielectric having a different refractive index. The metallic plate can be made of, for example, gold, silver, aluminum or alloys thereof. The local surface plasmon (LSP) mode around the dielectric disc and peg is excited by the transverse electric field at PSIM focus. The electric field underneath the dielectric peg is therefore dominated by the transverse component, which should have improved coupling efficiency into the medium due to the continuous boundary condition at head-medium interface. The light absorbed in the metallic plate will heat the iNFT, but the raised temperature will be lower than in the isolated NFT case because the metallic plate will dissipate heat away quickly.

From a fabrication standpoint, similar processes, either liftoff or etching, can be used to define the iNFTs. In fact, manufacturing iNFTs may give more process margin due to the fact that breakpoint to the ABS dimension can be relaxed depending on the iNFT design. While the previously known NFT may require extra process steps to heat-sink the NFT through making contact from the disc center to the nearby poles or other metals in order to dissipate the heat, a heat sink may not be required for the iNFT design as it includes more metal area. Even if the heat sink is still needed for the iNFT design, making a connection to the NFT would be easier when there is more metal area in the NFT layer to make contact to.

In the examples of FIGS. 5-11, and FIGS. 9A, 9B and 9C, the dielectric components of the near-field transducer can be constructed of $Ta_2O_5$, $Al_2O_3$, $SiO_2$, MgO, $MgF_2$, $Si_3N_4$, SiON, or TaSiOx. The metallic component(s) of the near-field transducer can be constructed of Au, Ag, Cu, Al, or their alloys. The core layer of the waveguide can be constructed of $TiO_2$, $Ta_2O_5$, $Si_3N_4$, Si, or high index dielectrics. The cladding layer of the waveguide can be constructed of $Ta_2O_5$, $Al_2O_3$, $SiO_2$, MgO, $MgF_2$, $Si_3N_4$, SiON, TaSiOx, or dielectrics with lower index than the core materials.

Specific examples of apparatus in accordance with various aspects of the invention have been modeled as described below. In the following examples, a planar solid immersion mirror (PSIM) is used to focus light to a diffraction-limited spot and to excite the iNFTs. The PSIM has a 50.mu.m opening and about a 6.mu.m ending. The waveguide structure uses $Ta_2O_5$ (n=2.1) as the core material and $Al_2O_3$ (n=1.6) as the cladding material. At core thickness of 125 nm and a light wavelength of 830 nm, the fundamental TE waveguide mode has a propagation constant=1.75. A magnetic medium, having a 5-nm thick dielectric layer (n=1.21), an iron layer of 10-nm thick, and a 20-nm thermal barrier layer MgO coated on a silicon substrate, is assumed. The power efficiency has been evaluated by both the optical power absorbed in the focused spot and in the magnetic layer (the volume of a cylinder of 50 nm diameter and 10 nm height).

The structures of FIGS. 10 and 11 have been modeled as follows. A gold (n=0.189+i 5.41) metallic plate 226 is divided into two parts by the middle alumina disc 222 and peg 224. The gold plate is 200 nm in height (h) and 30 nm in thickness (t). The diameter (d) of the alumina disk is 200 nm. The peg length (l) and peg width (w) is 60 nm and 20 nm respectively. The gold plate is patterned next to the waveguide core layer. The performance of this structure has been modeled.

Figure 12:
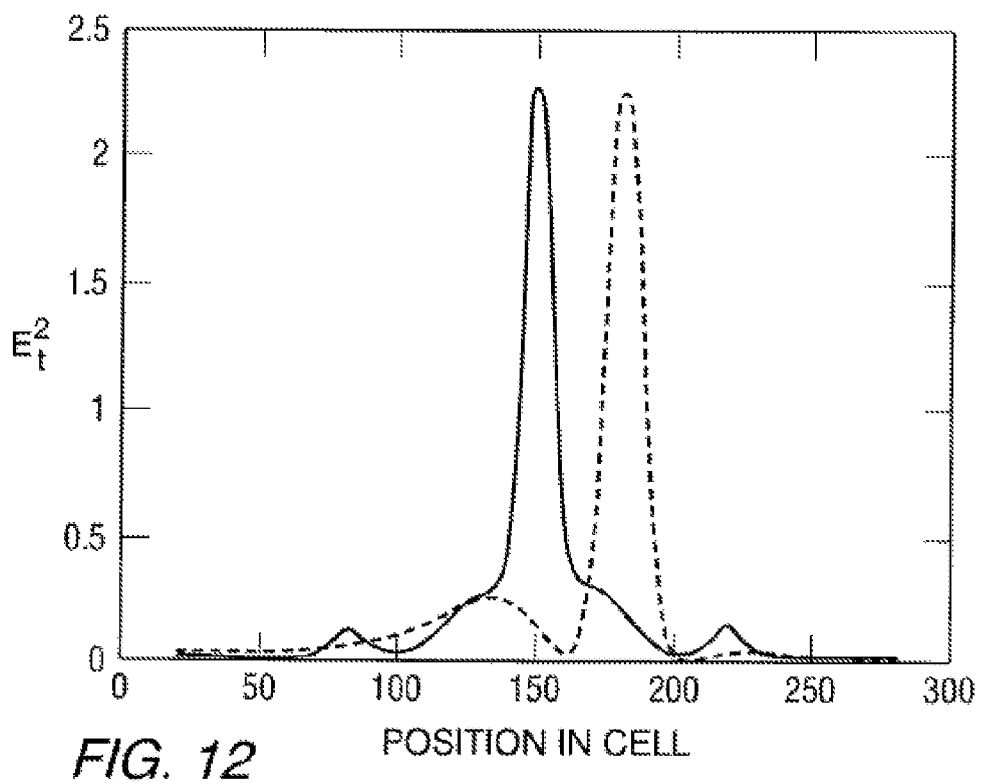
FIG. 12 is a line scan profile in the middle plane of the recording layer for the iNFT shown in FIGS. 10 and 11.

FIG. 12 shows a calculated line scan profile through the middle of the focused spot along the X and Y directions. The Full-Width Half-Maximum (FWHM) optical spot size is 28 nm along X direction and 38 nm along Y direction. The unit of cell is 2.5 nm in both X and Y directions. The calculated coupling efficiency (the absorbed power in the focused spot in the iron layer normalized by the total incident power) is 2.4%.

Figure 13:
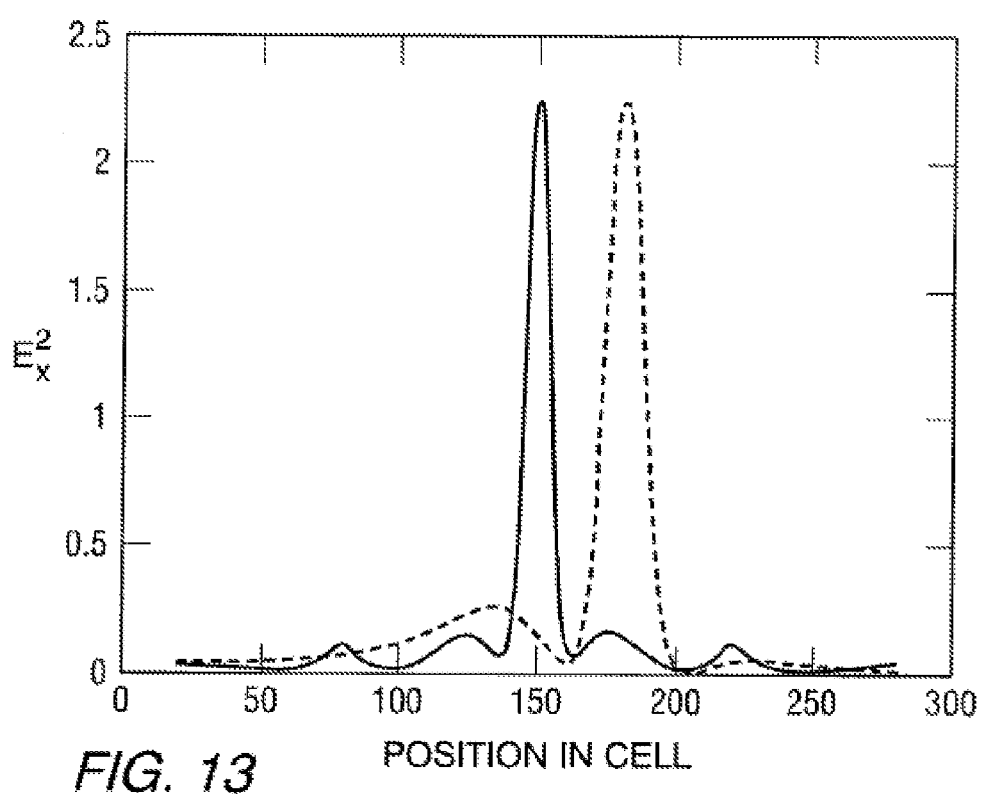
FIG. 13 is a line scan profile of the X-component of the electric field through the middle of the focused spot along the X and Y directions for the iNFT shown in FIGS. 10 and 11.

FIG. 13 shows a calculated line scan profile of the X-component of the electric field through the middle of the focused spot along the X and Y directions. The unit of cell is 2.5 nm in both X and Y directions. As can be seen from FIG. 12 and FIG. 13, the electric field in the recording medium is dominated by the transverse component.

Figure 14:
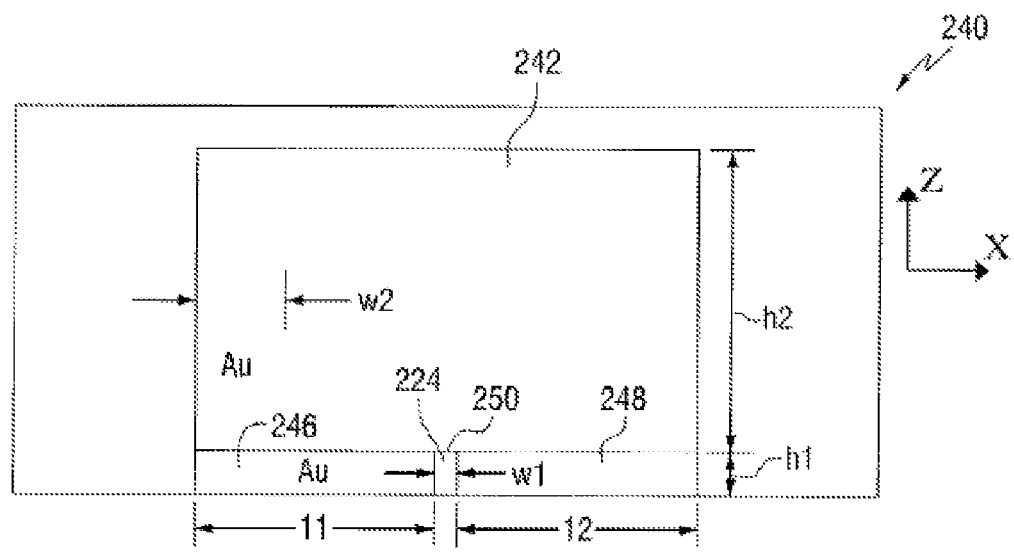
FIG. 14 is a cross-sectional view of a pair of gold nanorods in combination with two gold long wires in the XZ plane.

FIG. 14 shows the XZ cross-sectional view of another inverse near-field transducer 240 including a pair of gold nanorods 242, 244 attached with two gold relatively long wires 246, 248. The two gold nanorods have the same length (L1=L2) of 200 nm and are 60 nm in height (h1). The gap 250 between the two nanorods is 20 nm wide (w1). The attached gold wires are set to be 250 nm (h2) for the modeling due to the finite computational space. The width of the gold wires is 60 nm (w2). Both the gold nanorods and wires are built in the waveguide cladding layer next to the core, and have a thickness of 20 nm along the Y direction.

Figure 15:
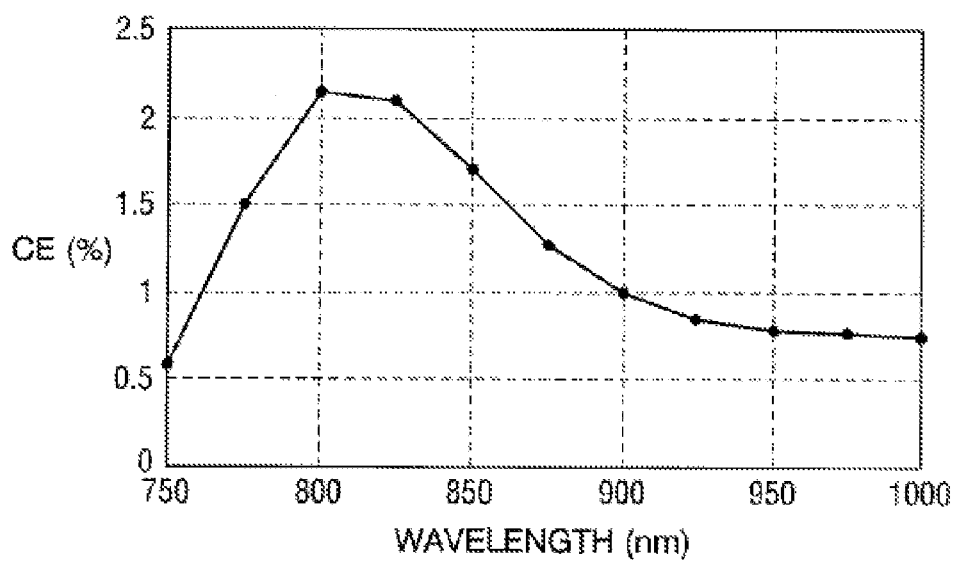
FIG. 15 is a graph of a computed coupling efficiency (CE) into the recording layer for the transducer of FIG. 14.

FIG. 15 shows the FDTD modeling results of the coupling efficiency (CE) into the recording layer as a function of the wavelength of incident light. One resonance appears at 800-825 nm in the simulated wavelength range, where the CE has a maximum of about 2.1%.

Figure 16:
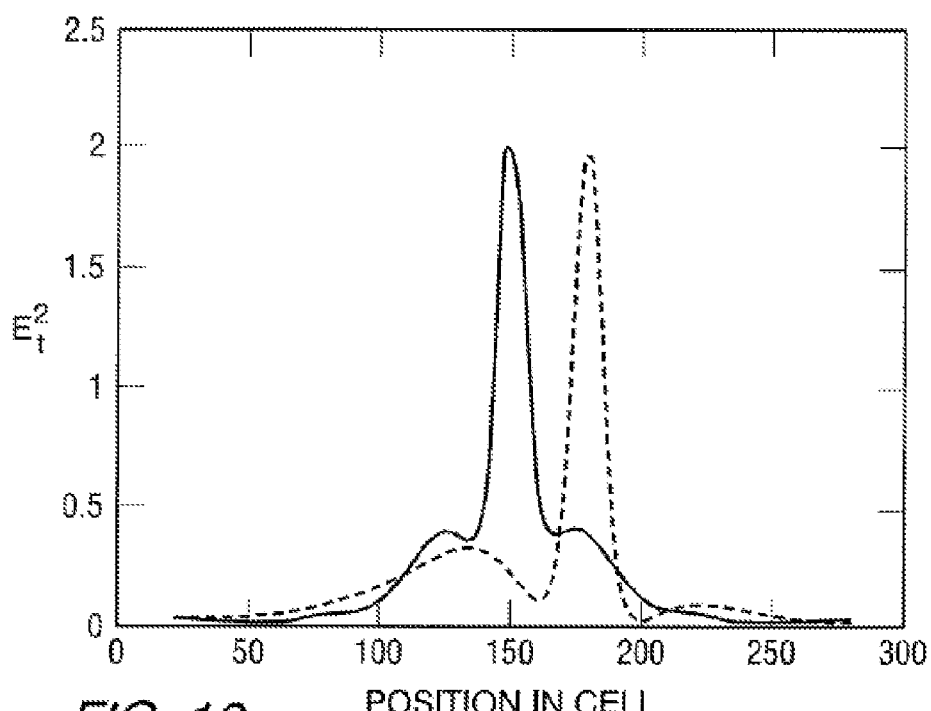
FIG. 16 is a computed electric field intensity of the iNFT shown in FIG. 14.

FIG. 16 shows the calculated line scan profile through the middle of the focused spot along the X and Y directions. The FWHM optical spot size is calculated to be 33 nm along the X direction and 28 nm along the Y direction. FIG. 16 shows the calculated line scan profiles in the middle plane of the recording layer for an iNFT shown in FIG. 14. The unit of cell is 2.5 nm in both X and Y directions.

Figure 17:
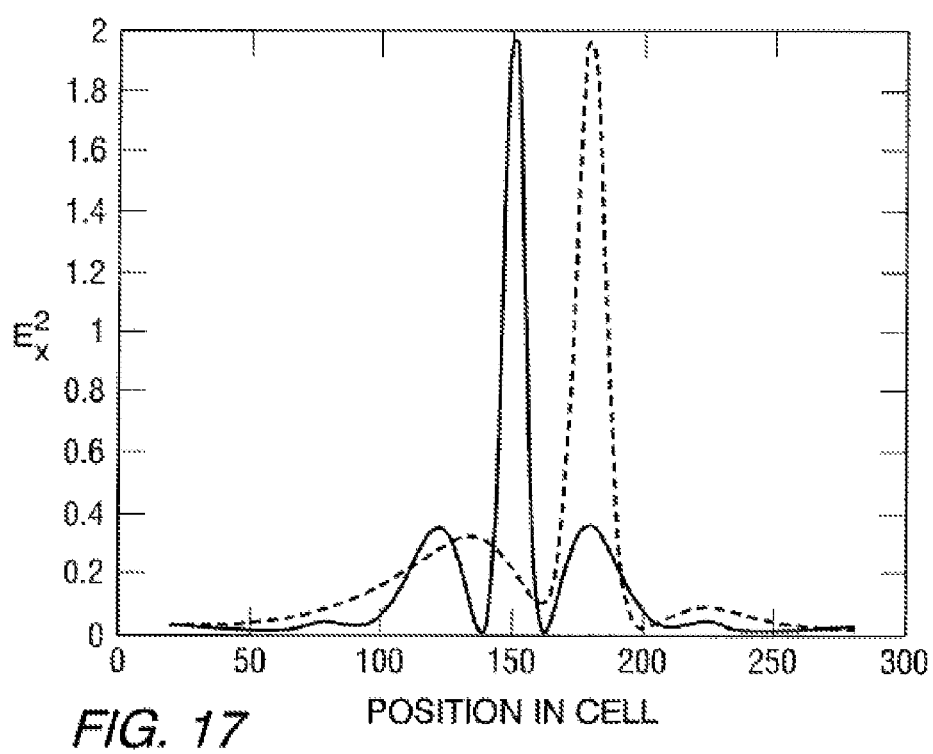
FIG. 17 is a line scan profile in the middle plane of the recording layer for the iNFT shown in FIG. 14.

FIG. 17 shows the calculated line scan profile of the X-component of the electric field through the middle of the focused spot along the X and Y directions, which is the dominant electric field component in the recording layer as expected. FIG. 17 shows calculated line scan profiles of the X-component of the electric field through the middle of the focused spot along the X and Y directions. The unit of cell is 2.5 nm in both X and Y directions.

In another aspect of the invention, a near-field transducer 258 is configured in a "sunrise" or "inverted angel" design. In the "sunrise" design shown in FIG. 18, one or more rings 260, 262, 264 and 266 are introduced around the disc 268 of the "lollipop" near-field transducer 270. A peg 272 extends from the bottom of the disc 268. Going radially outward from the lollipop disc, every other ring starting from the second ring can be made out of plasmonic materials such as gold, silver, copper, aluminum, or alloys of these materials. The remaining rings can be made out of dielectric materials (lossy or otherwise) such as silicon, silicon oxide, titanium oxide, tantala, aluminum oxide and silicon nitride.

The rings need not be concentric with the lollipop disc. The rings could be distorted such that the shape changes, but the topology remains the same. For example, the topology includes a central metal piece, a dielectric gap, and a surrounding thin metal region. The shape of the components need not be as shown in the examples. Various distortions of the example shapes can be used within the scope of the invention. Given the description herein, such distorted shapes would be apparent to those skilled in the art. Similarly, the disc can also be distorted while maintaining a "single metal region" topology.

Figure 19:
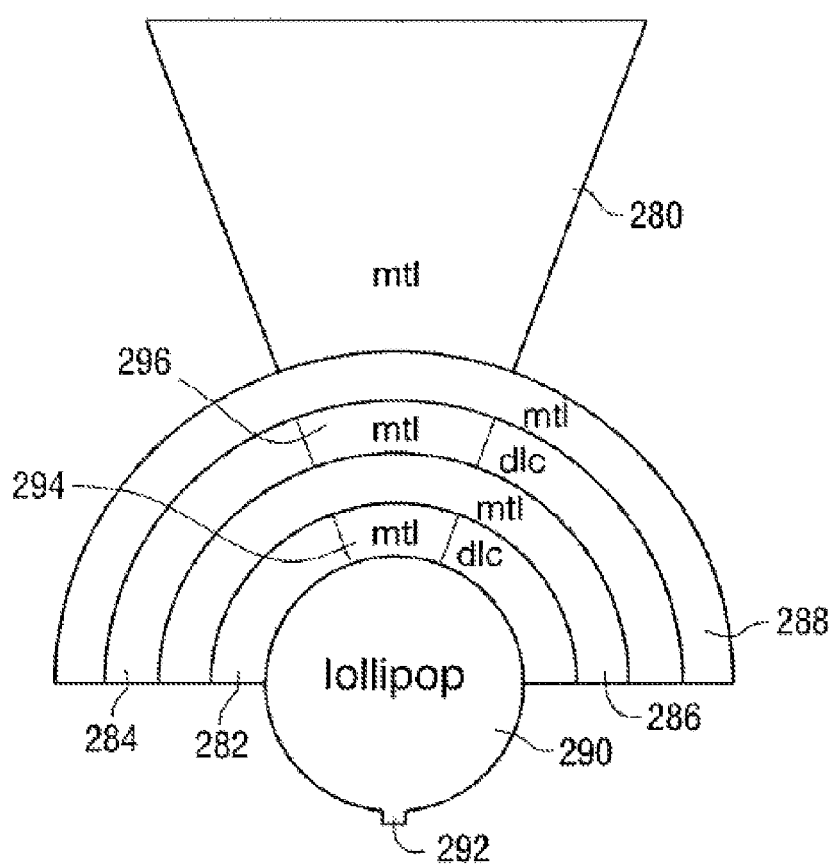
FIG. 19 is a schematic representation of a transducer according to another aspect of the invention.

In an "inverted angel" design, a hypothetical trapezoidal region 280 is chosen on the top of the disc in the "sunrise" or the "lollipop" design as shown in FIG. 19. This region has the same thickness as the disc and/or the rings. Thus, this region contains portions of dielectric rings 282, 284, and portions of metal rings 286, 288 in the trapezoidal region near the disc 290. A peg 292 extends from the bottom of the disc 290. The portions 294, 296 of the dielectric rings in the trapezoid are replaced with metallic regions. The choice of the thickness of the "sunrise" and the "inverted angel" NFTs is similar to that of the "lollipop" design. The location of the transducer could be in the core or cladding of the waveguide. The polarization of the focused field has to be the same as that of the focused field in the "lollipop" design. The NFT is placed in the vicinity of the focus 300 of a PSIM 302 as shown in FIG. 20.

A resonant "sunrise" design typically has an area larger than a resonant "lollipop" design for the same wavelength. The corresponding optical cross-section is also larger. Hence, this results in a higher coupling efficiency. It also couples in the side-lobes from the PSIM focus. These side-lobes would otherwise cause a large spot in the medium. The overall coupling efficiency of the "sunrise" design can be .about.150% of the "lollipop" design. Due to the localized surface plasmon resonance of the NFT, there is a possibility of the NFT heating up to temperatures that compromise the reliability of the device. The "inverted angel" design provides a means for heat sinking the "lollipop". It provides for heat sinking in two ways: it increases the surface area of the region that radiates in the surrounding waveguide, and it provides a platform to which other heat sinking structures can be connected.

Figure 18:
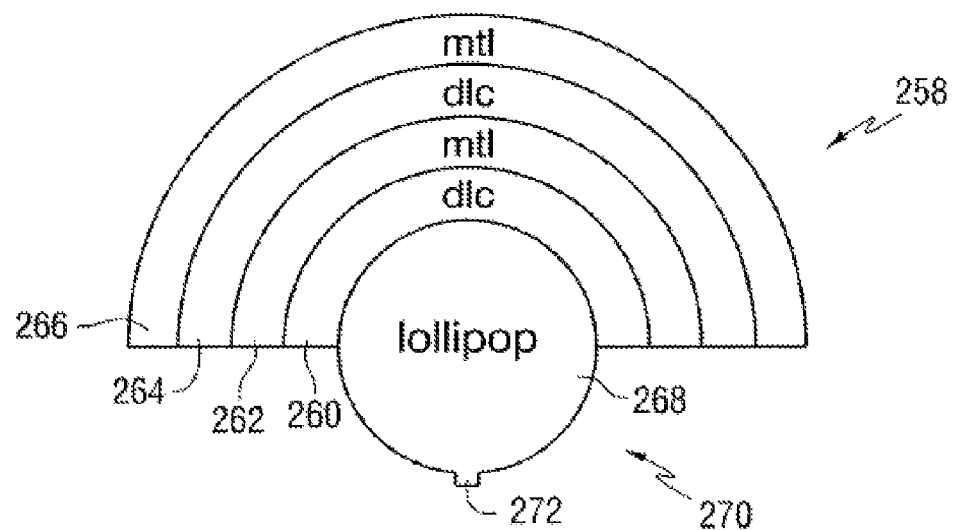
FIG. 18 is a schematic representation of a transducer according to another aspect of the invention.
Figure 20:
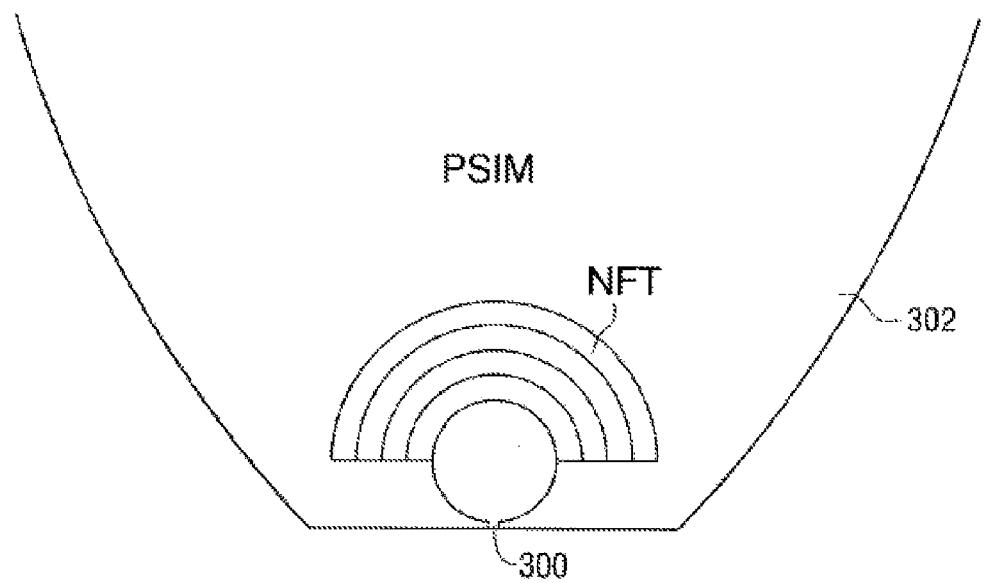
FIG. 20 is a schematic representation of the transducer of FIG. 18 in a waveguide.
Figure 21:
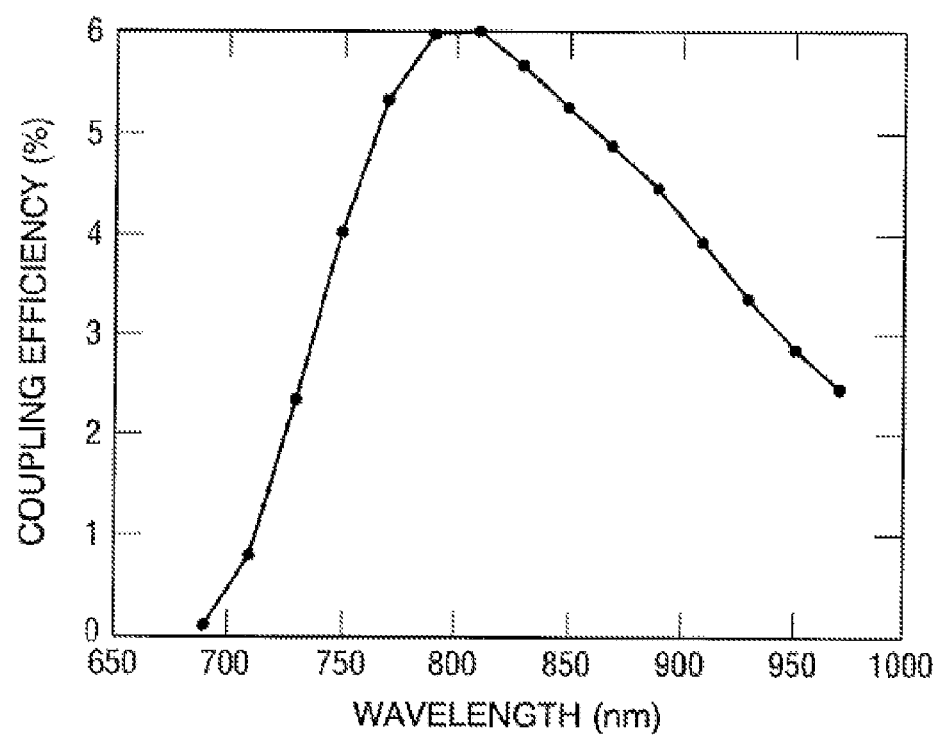
FIG. 21 is a graph of coupling efficiency versus wavelength.

In the examples of FIGS. 18-20, the dielectric components of the near-field transducer can be constructed of, for example, alumina, tantala, titania, magnesium oxide, silicon oxinitride, silicon nitride, or combinations thereof. The metallic components of the near-field transducer can be constructed of, for example, gold, silver, copper, aluminum and their alloys, or combinations thereof. The core layer of the waveguide can be constructed of, for example, tantala, silicon nitride, silicon, or combinations thereof. The cladding layer of the waveguide can be constructed of, for example, alumina, magnesium oxide, silica, titania, silicon oxinitride, or combinations thereof.

While the invention has been described in terms of several examples, it will be apparent to those skilled in the art that various changes can be made to the disclosed examples, without departing from the scope of the invention as set forth in the following claims. The implementations described above and other implementations are within the scope of the following claims.

What is claimed is:

1. An apparatus comprising:
  a near-field transducer positioned to receive light from a waveguide, the near-field transducer comprising:
  a metallic disc having a peg extending from a first edge;
  a first dielectric region around a second edge of the metallic disc, the second edge being opposed to the first edge; and
  a first metallic region around an outer edge of the first dielectric region, the outer edge facing away from the metallic disc.

2. The apparatus of claim 1, wherein the second edge of the metallic disc comprises a circular shape.

3. The apparatus of claim 2, wherein the first dielectric region and the first metallic region are arranged concentrically around the metallic disc.

4. The apparatus of claim 1, wherein the metallic disc comprises a circle, the second edge extending over a half of the circle.

5. The apparatus of claim 1, further comprising:
  a second dielectric region around an outer edge of the first metallic region; and
  a second metallic region surrounding an outer edge of the second dielectric region.

6. The apparatus of claim 1, wherein the peg faces an air bearing surface of a magnetic recording head.

7. The apparatus of claim 1, wherein the waveguide includes a core layer and a cladding layer, and wherein the near-field transducer is positioned in the core layer.

8. An apparatus comprising:
  a waveguide that extends proximate to an air-bearing surface of a magnetic recording head;
  a near-field transducer capable of receiving light from the waveguide, the near-field transducer comprising:
  a metallic disc having a first edge that faces the air-bearing surface and a second edge facing away from the air-bearing surface;
  a metallic peg disposed on the first edge of the metallic disc; and
  a series of rings disposed on the second edge of the metallic disc, the series of rings alternating between a dielectric material and a metallic material, wherein a first ring of the series of rings is proximate the second edge of the metallic disc, the first ring comprising the dielectric material.

9. The apparatus of claim 8, wherein the second edge of the metallic disc comprises a circular shape.

10. The apparatus of claim 9, wherein the series of rings are arranged concentrically around the metallic disc.

11. The apparatus of claim 8, wherein the metallic disc comprises a circle, the second edge extending over an upper half of the circle.

12. The apparatus of claim 8, further comprising a trapezoidal region of a second metallic material extending from the second edge of the metallic disc to beyond the series of rings, the trapezoidal region replacing portions of the dielectric material with the second metallic material.

13. The apparatus of claim 8, wherein the waveguide includes a core layer and a cladding layer, and wherein the near-field transducer is positioned in the core layer.

14. An apparatus comprising:
  a near-field transducer positioned to receive light from a waveguide, the near-field transducer comprising:
  a metallic disc having a peg extending from a first edge;
  a first dielectric region around a second edge of the metallic disc, the second edge being opposed to the first edge;
  a first metallic region around an outer edge of the first dielectric region, the outer edge facing away from the metallic disc; and
  a trapezoidal region of a metallic material extending from the second edge of the metallic disc to beyond the first metallic region, the trapezoidal region replacing portions of the first dielectric region with the metallic material.

15. The apparatus of claim 14, wherein the second edge of the metallic disc comprises a circular shape.

16. The apparatus of claim 15, wherein the first dielectric region and the first metallic region are arranged concentrically around the metallic disc.

17. The apparatus of claim 14, further comprising:
   a second dielectric region around an outer edge of the first metallic region; and
   a second metallic region surrounding an outer edge of the second dielectric region, wherein the trapezoidal region extends beyond the second metallic region and replaces portions of the second dielectric region with the metallic material.

18. The apparatus of claim 14, wherein the peg faces an air bearing surface of a magnetic recording head.

19. The apparatus of claim 14, wherein the waveguide includes a core layer and a cladding layer, and wherein the near-field transducer is positioned in the core layer.

* * * * *